United States Patent [19]

Staiger

[11] Patent Number: 5,752,065
[45] Date of Patent: May 12, 1998

[54] ONE CYCLE PROCESSOR FOR REAL TIME PROCESSING

[75] Inventor: Dieter E. Staiger, Weil im Schoenbuch, Germany

[73] Assignee: International Business Machines Corporation, Armonk, N.Y.

[21] Appl. No.: 477,207

[22] Filed: Jun. 7, 1995

[30] Foreign Application Priority Data

Nov. 29, 1994 [EP] European Pat. Off. .............. 94118741

[51] Int. Cl.⁶ ........................................................ G06F 15/76
[52] U.S. Cl. .................................. 395/800.01; 395/800.25
[58] Field of Search ...................................... 395/375, 800, 395/800.01, 800.4, 800.19, 800.25, 800.43

[56] References Cited

U.S. PATENT DOCUMENTS

| | | | |
|---|---|---|---|
| 3,872,447 | 3/1975 | Tessera et al. | |
| 4,156,279 | 5/1979 | Wilhite | 364/200 |
| 4,777,587 | 10/1988 | Case | 395/375 |
| 5,299,320 | 3/1994 | Aono | 395/375 |
| 5,459,843 | 10/1995 | Davis | 395/375 |
| 5,553,255 | 9/1996 | Jain | 395/375 |
| 5,553,276 | 9/1996 | Dean | 395/550 |

FOREIGN PATENT DOCUMENTS

PCT/US86/
00243  4/1986  European Pat. Off. .

OTHER PUBLICATIONS

"ATE Digital Testing Using a ProgrammableMicrosequencer Architecture", Beat, J., IEEE Systems Readiness Technology Conference, Sep., 1990, paes 269–273.

Microprocessors and Microsystems, Mar., 1988, UK, vol. 12, No. 2, pp. 101–106.

Analog Devices, Inc., 14 Aug. 1986, *The Whole Document*.

IBM Technical Disclosure Bulletin, vol. 23, No. 8, Jan. 1981, New York, US, pp. 3848–3851.

Balm et al. 'OP Code Extender. Jan. 1981.'.

IBM Technical Disclosure Bulletin, vol. 23, No. 10, Mar. 1981, New York, US, pp. 4700–4701.

D.M. Jones, 'Dynamic Microinstruction Word Width Expansion. Mar. 1981.'.

*Primary Examiner*—Eric Coleman
*Attorney, Agent, or Firm*—Robert A. Walsh

[57] ABSTRACT

A processing unit (100) with a processor (110) for processing an operation code and a method for processing the operation code in the processing unit (100). The processor (110) comprises an operation code control unit (200) for receiving and processing the operation code in a boolean circuit (230) and generating a logical result thereof, and a next address control unit (210) comprising a multiplexing unit (250) with a plurality of input lines (A–D) selectable by the multiplexing unit (250) by means of the logical result of the boolean circuit (230). The processor (110) is triggerable by a trigger signal (CLOCK) and each operation code is processable by the processor (110) between successive trigger signals (CLOCK). When the trigger signal appears, the processor (110) issues a signal comprising an address of the operation code to be processed to the control memory (129) and/or a user data memory (140). The operation code corresponding to that address is loaded from the control memory (120) to the processor (110) and processed therein. One result of this processing is that the address of the successive operation code, which will be processed when the successive trigger signal appears. This loading and processing of operation code happens continuously in each cycle between successive trigger signals, until the end of program is reached or an interrupt signal is calling a stop routine. Each operation code is processed between successive trigger signals (or within one CLOCK cycle) allowing a predictable timing of a sequence of operation codes so that a real time condition is achievable.

14 Claims, 12 Drawing Sheets

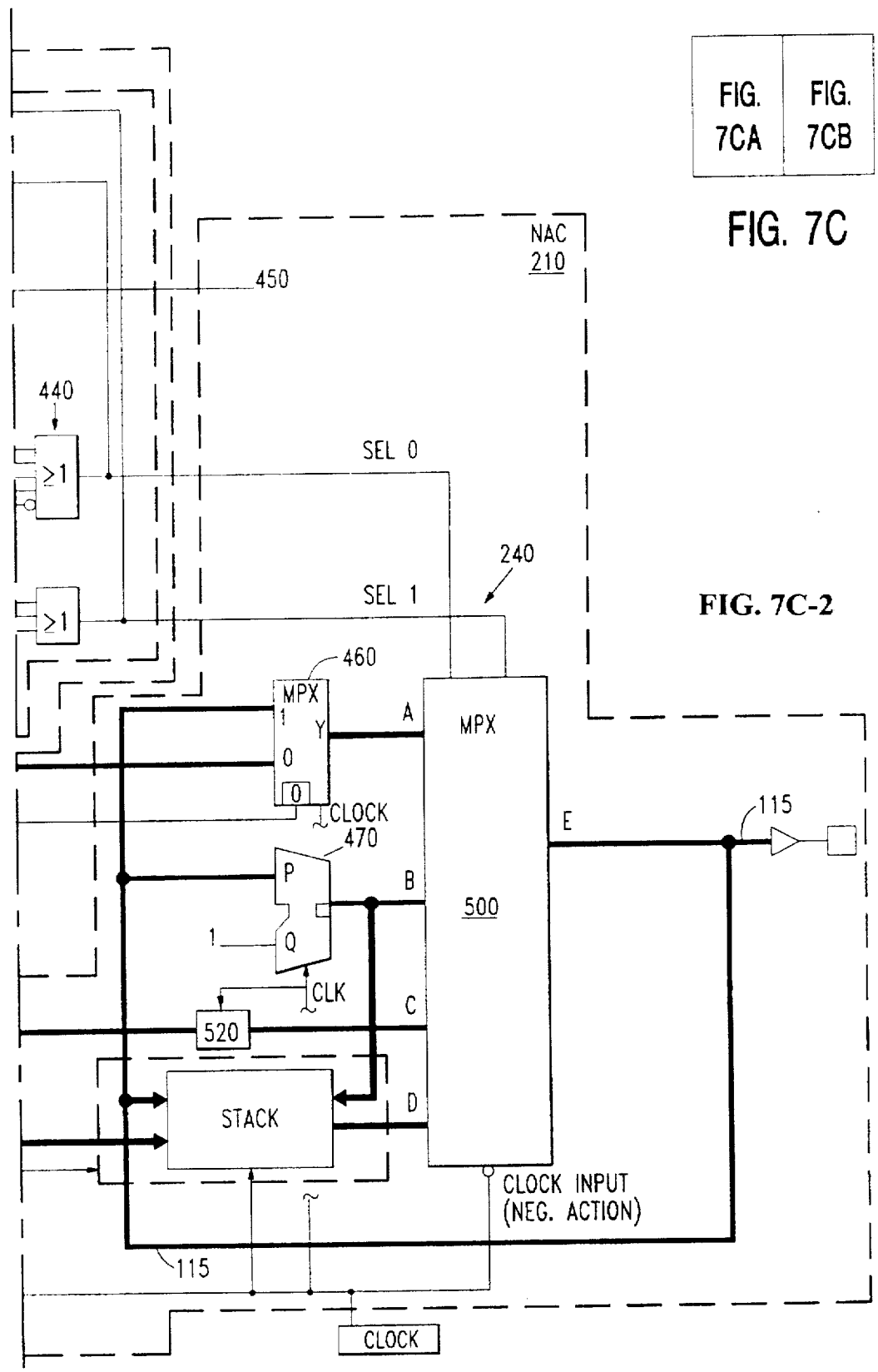

ONE CYCLE PROCESSOR FOR REAL TIME PROCESSING

FIELD OF THE INVENTION

The invention relates to processors for processing an operation code, and more particularly to real time processors.

PRIOR ART

A schematic representation of microprocessors according to the prior art can be found in the EPO Applied Technology Series, Volume 8, CORNILLIE, O., "Microprocessors" and is shown in FIG. 1. The prior art microprocessor of FIG. 1 comprises a control unit, which deciphers the instructions contained in the instruction register. Deciphering herein means, contents of the instruction register are interpreted so the commands may be executed. The internal connections needed to perform the series of operations for instruction execution, are made in sequence, according to a microprogram.

The microprocessor 5 of FIG. 1 is built in a register structure that comprises an instruction register 10 receiving instructions from a data bus 12. An index register 14 is used for addressing the external memory with the contents of the register as a reference. A program counter 16 contains the address where the following instruction may be found. Additions, subtractions and the logic functions AND, OR, NAND, EXOR are performed by a shift register arithmetic logic unit (ALU) 20 while at the same time bits of a word may be shifted to the left or right. The results of operations carried out by the ALU can be stored in an accumulator 22 and output to an external device, or conversely a word from an external device may be input to the accumulator. Other registers, such as auxiliary internal registers, may also serve as indicators ("pointers") 24 for an external memory (the contents of the register, therefore, acting as an address.)

The processor of FIG. 1 further comprises external connections to an address bus 26 and a data bus by which a control memory (not shown) containing operation and condition code required for an operation is addressable. To begin an operation in the processor 5 of FIG. 1, the program counter 16 is set at a certain position and indicates the appropriate address in the memory at which the program is to start. At this start address, the microprocessor looks for its first instruction, transfers it to the instruction register 10, while at the same time increasing the program counter 16 by one so that the program in the memory is run through in sequence. The instruction is decoded, after which the processor knows the number of bytes making up the instruction and how the internal logic must be connected to execute the instruction. Finally the instruction is executed, and similarly the whole program. Operation conditions, e.g., the value of program counters, are continuously applied within the processor.

BACKGROUND

The microprocessors as known in the prior art comprise a plurality of clocked registers for the processing of the incoming data and address. The incoming operation code is first registered in an input register and synchronously clocked out when the next clock signal appears. Further registering and synchronously clocking out of the data is provided during the processing of the operation code. The number of clock cycles needed for the processing of a certain operation code is therefore dependent on the complexity of that operation, whereby a clock cycle is the time from a first clock signal to the end of a seccussion of clock signals.

Real time processing has become more important in recent years. Real time processing means a process in which the time at which output is produced is critical. This is usually because the input corresponds to some movement in a physical world and the output has to relate to that same movement. The lack from input time to output time as a first real time condition must be sufficiently small for acceptable timeliness, whereby timeliness depends on the total system. Real time systems are usually considered to be those in which the response time is in the order of milliseconds; interactive systems are those with response times in the order of seconds; and batch systems are those with response times in the order of hours or days. A further real time condition is that real time systems require a predictable and minimized interrupt latency, which is the time from an interrupt call until the beginning of its execution. An interrupt call is a signal to a processor showing that an asynchronous event has occurred. The current sequence of instructions is temporarily suspended (interrupted), and a sequence appropriate to the interruption is started in its place. An immediate reaction on interrupt calls is a basic condition for real time applications.

Real time processing with a processor architecture, as known in the art, requires fast and expensive components, such as high speed processors and high speed control memories, to realize a real time condition for processing.

High speed processors for real time processing generally require a simultaneous and parallel application of all data necessary for the operation to avoid time losses due to a serial data application. In processor structures, as known in the art, all of the data required for the operation is therefore simultaneously available in the respective control memories, so control memories with a bit length of about 100 to 500 bit are commonly used. On one hand, the addressing and controlling of those 100 to 500 bits long memories results in a loss of processing speed due to:

delays caused by address fan out, high capacitive load and broad signal distribution;

long transmission lines required for the addressing memories;

big processor ASICs with large physical dimensions;

high power consumption; and the need of additional drivers.

On the other hand, a serial and/or pipelined data application causes a clear limit for the achievable processing speed.

SUMMARY OF THE INVENTION

It is an advantage of the invention to provide a processor that is suitable to be used for real time processing.

It is another advantage of the invention to provide a processor with a minimized interrupt latency.

It is a further advantage of the invention to provide a processor with low cost components but high processing speed.

The advantages of the invention are solved by the independent claims that is by a processing unit and by a method of operating a processing unit.

When a trigger signal (e.g., a CLOCK signal) appears, a processor according to the invention issues an address for the operation code, to a control memory and/or a user data memory. The operation code corresponding to that address is loaded from the control memory to the processor and processed therein. One result of this processing is that the address of the successive operation code will be processed when successive trigger signals appear. This loading and processing of operation code happens continuously in each cycle between successive trigger signals, until the end of the program is reached or an interrupt signal calls a "stop" routine.

Each operation code is processed between successive trigger signals (or within one CLOCK cycle) allowing a predictable timing of a sequence of operation codes so that this real time condition is achievable. When an interrupt signal calls for an interrupt routine, the interrupt latency (that is the time from an interrupt call until the beginning of its execution) in the processor 110 is smaller then the time between successive trigger signals (or one CLOCK cycle when a synchronous clocking is applied).

DESCRIPTION OF THE DRAWINGS

The invention will now be described by way of example and with reference to the accompanying drawings in which:

FIG. 6A, 6A1, 6A2 shows a first detailed embodiment of the processor 110 for the application of FIG. 5.

FIG. 7A,7A1,7A2 shows another embodiment of the processor 110 without additional registers.

FIG. 7C,7C1,7C2 shows an implementation of the transparent latch 510.

DETAILED DESCRIPTION OF THE INVENTION

Figure 2:
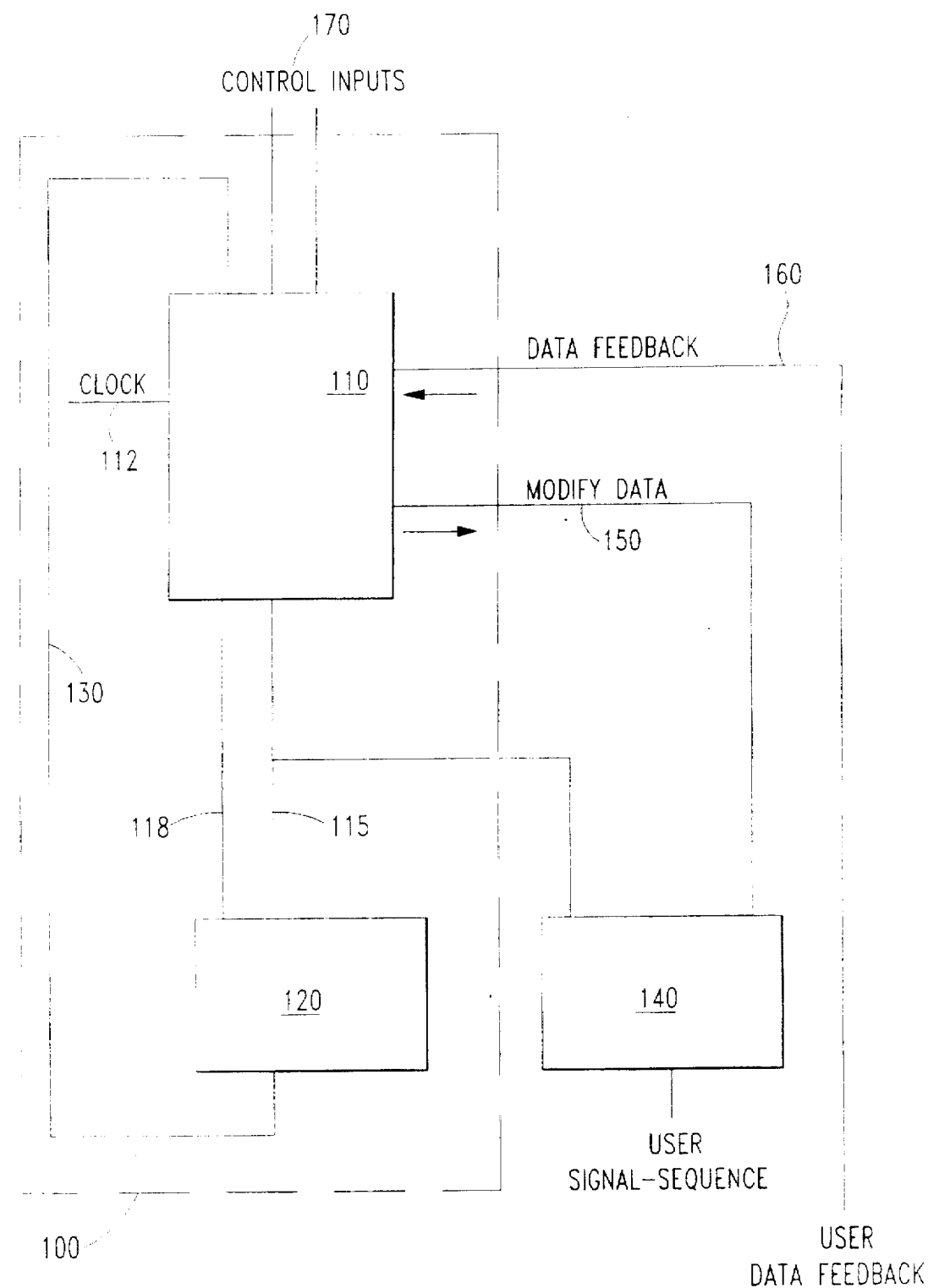
FIG. 2 shows a general block diagram of a processing unit 100 comprising a processor 110 according to the invention.

FIG. 2 shows a general block diagram of a processing unit 100 comprising a processor 110 according to the invention. An output of the processor 110 is coupled via an address line 115 and a line 118 to a control memory (CM) 120. A feedback loop 130 provides a further connection between an output of the control memory 120 and an input of the processor 110.

The control memory 120 contains operation codes comprising coded functions and conditions for each operation (as a pre-loaded program, e.g., from a hard disk, diskette or a host computer) for the processor 110 and is also controlled by the processor 110. The control memory 120 is addressable by the processor 110 via the address line 115 and data in the control memory 120 can be modified by the processor 110 via line 118. An additional user data memory 140 is addressable by the processor 110 via the address line 115 parallel to the control memory 120, allowing to implement special target functions for the processor 110 (e.g., algorithmic logic operations in an ALU, or a frequency or timing generation as in an example that will be explained later). The user data memory 140 is pre-loadable with a digital information containing operation codes and operation conditions necessary for the implementation of the special target functions. The user data memory 140 can be modified by the processor 110 via a modify data output 150 during the operation of the program, for example to implement a "state-machine."

The processor 110 further comprises a CLOCK input 112, a data feedback input 160 for receiving a user data feedback signal and control inputs 170 for receiving processor commands, flags and interrupt signals.

It is to be understood that the processing unit 100 is not limited by the embodiment as shown in FIG. 2. Various other inputs and outputs of the processor 110 are possible and depend on the actual application. Furthermore, it is to be understood that the control memory 120 and the user data memory 140 are addressable by separate address lines, or can be modified directly through the address lines without the need of additional modification lines as lines 115 and 150.

Figure 1:
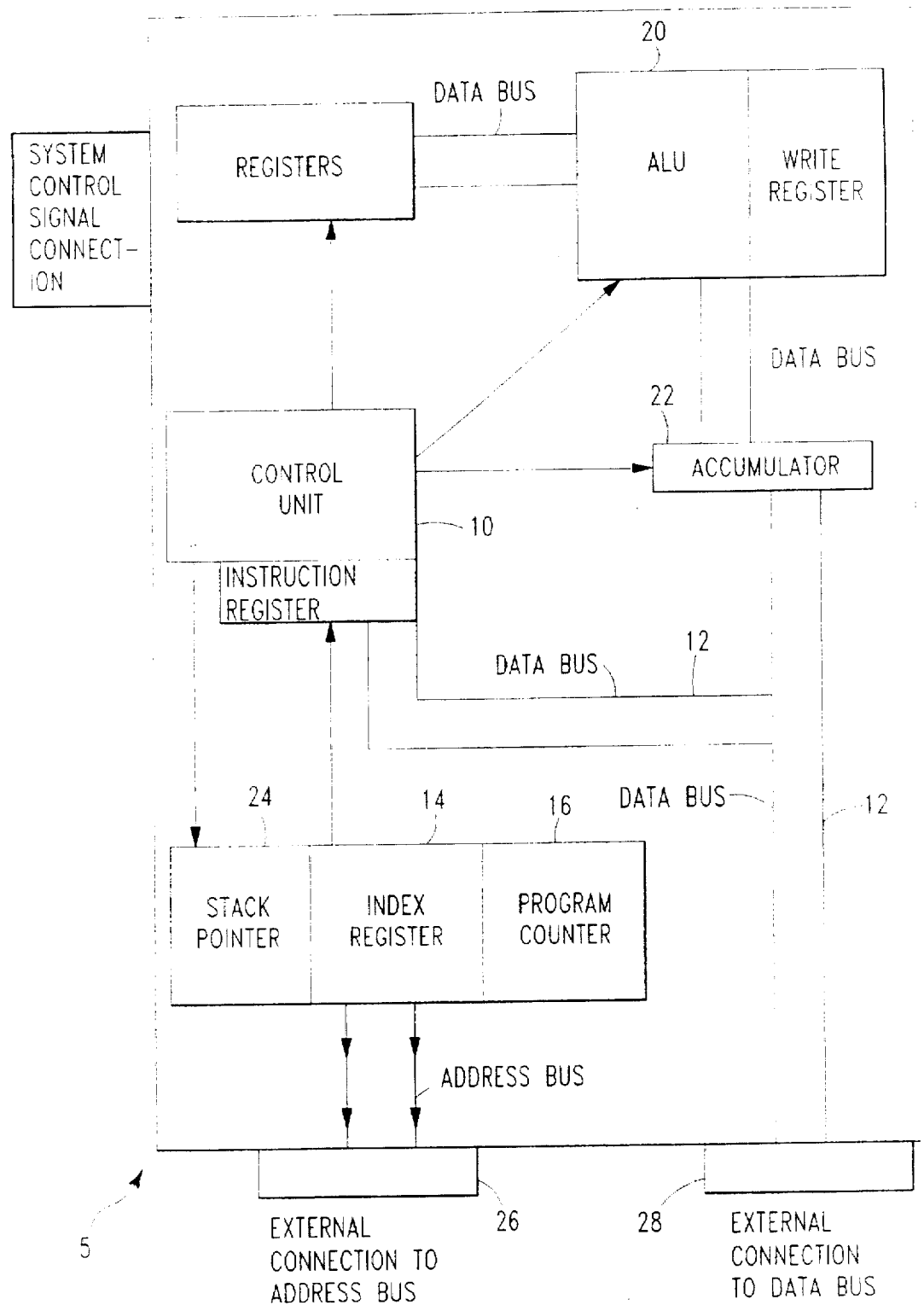
FIG. 1 shows a schematic representation of microprocessors according to the prior art.

Overall, the processing in the real time processing unit 100 is carried out substantially by the processing in FIG. 1. An operation code is loaded from the control memory 120 and processed in the processor 110. However, a major difference appears in the differing sequence of the processing of the operation codes relative to the CLOCK signal. As discussed earlier, the number of clock cycles required for the processing of one operation code in the prior art processors is determined by the complexity of the operation. In the real time processing unit 100 according to the invention, however, the processing time for one operation code is limited to the cycle time between successive clocking signals. That means that the number of clock cycles required for the processing of one respective operation code in the processor 110 is determined to be only one clock cycle.

When a CLOCK signal appears, processor 110 issues a signal comprising an address ADDRm on the address line 115 to the control memory 120 and the user data memory 140. The address ADDRm represents the address of the operation code that is to be processed by processor 110 before the next CLOCK signal will appear. Simultaneously, data can be modified by the processor 110 in the control memory 120 via line 118 and in the user data memory 140 via line 150. Other user data or control data can be received by the processor 110 on the lines 160 or 170. When the address ADDRm on address line 115 is valid, the operation code corresponding to the applied address ADDRm stored in the control memory 120 is applied via line 130 to the processor 110 and processed therein. One result of the processing of the applied operation code in the processor 110 is the address ADDRn of the next operation code that is to be processed when the next CLOCK signal appears.

When the next CLOCK signal appears, processor 110 issues a signal comprising the address ADDRn on the address line 115 to the control memory 120 and the user data memory 140. The address ADDRN represents the address of the operation code that is to be processed by processor 110 before the successive CLOCK signal will appear. Simultaneously, data can be modified by the processor 110 in the control memory via line 118 and in the user data memory 140 via line 150, and other user data or control data can be received by the processor 110 on the lines 160 or 170. When the address ADDRn on address line 115 is valid, the operation code corresponding to the applied address ADDRn, stored in the control memory 120, is applied via line 130 to the processor 110 and processed therein. Again.

one result of the processing of the applied operation code in the processor 110 is the address ADDRs of the successive operation code that is to be processed when the successive CLOCK signal appears.

It is to be understood that the processor 110 can be clocked with a fixed clock frequency (e.g., by a crystal oscillator), or asynchronously whenever the processing of an operation code is required.

In more general terms, when a trigger signal (e.g., the CLOCK signal) appears, the processor 110 issues a signal comprising the address of the operation code to be processed to the control memory 120 (and the user data memory 140). The operation code corresponding to that address is downloaded from the control memory 120 to the processor 110 and processed therein. One result of this processing method is the address of the successive operation code to be processed, which will be processed when the successive trigger signal appears. This loading and processing of operation code happens continuously in each cycle between successive trigger signals, until the end of a program is reached or an interrupt signal is calling a stop routine.

Since each operation code is processed between successive trigger signals (or within one CLOCK cycle), the processor 110 of the present invention allows a predictable timing of a sequence of operation codes so that this real time condition is easily achievable. When an interrupt signal is calling for an interrupt routine, the interrupt latency (that is the time from an interrupt call until the beginning of its execution) in the processor 110 is smaller then the time between successive trigger signals (or one CLOCK cycle when a synchronous clocking is applied).

Figure 3:
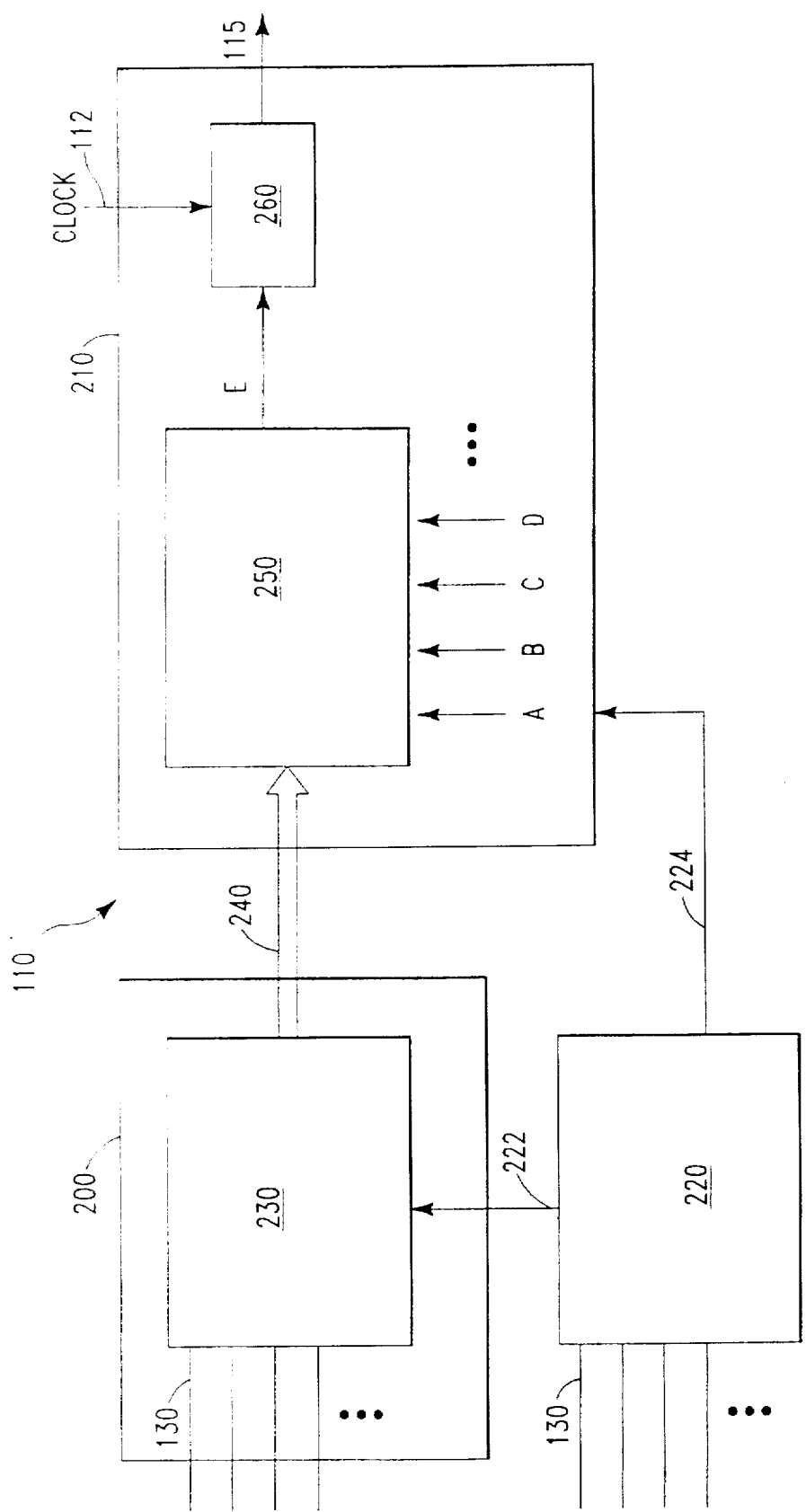
FIG. 3 shows an embodiment of the processor 110 of FIG. 2.

FIG. 3 shows an embodiment of the processor 110 according to the invention. The processor 110 comprises a condition and operation code control unit (COC) 200, a next address control unit (NAC) 210 and a functional processor unit 220. The COC 200 and the functional processor unit 220 receive the operation code on the feed back loop lines 130 from the control memory 120. The functional processor unit 220 processes the applied operation code (e.g., in a program counter, flag register compare, etc.) and generates signals thereof (e.g., a program counter signals, program load signals, flag signals, etc.) on its output lines 222 and 224 to the COC 200 and the NAC 210. The signals generated by the functional processor unit 220 are internally used in the processor 110 as functional control signals for the processing of the operation code.

The condition and operation code control unit (COC) 200 processes the operation code in a boolean interlock circuit 230, and the logical result thereof is set on control lines 240 and serves as a control input for a multiplexer 250 of the next address control unit 210. It is to be understood that the boolean interlock circuit 230 only comprises logical boolean elements such as AND-, OR-, EXOR- or Inverter gates. The combination of the logical boolean elements to a boolean function in the boolean interlock circuit 230 is determined by the respective operation code used for the processing in the processing unit 100. The operation code on the lines 130 is interpreted by the boolean interlock circuit 230 and the result is output on control lines 240.

The multiplexer 250 in FIG. 3 comprises a plurality of input lines A, B, C, D, etc. Each of the plurality of input lines A, B, C, D, etc. is selectable for the multiplexer 250 by means of the control lines 240. The input lines A, B, C, D, etc. represent various possibilities of addresses that contain the next operation code to be processed, and are derived, e.g., from the presently valid address, an address applied from the control memory 120 via line 130 or a user applied address. The input line selected by the control lines 240 is set on an output E of the multiplexer 250 and then registered in a register 260. Register 260 further receives the CLOCK signal, which clocks the address data from line E to the address line 115. It is to be understood that the multiplexing function provided by the multiplexer 250 can be established by any kind of switching circuit as known in the art.

It is apparent to those familiar in the art that a reliable time matching of the signals applied to the multiplexer 250 has to be provided, so that it is ensured that even the slowest signal is applied to the multiplexer 250, and therefore to the address register 260, in time that means before the next CLOCK signal appears. The logical boolean operation within the boolean interlock circuit 230 and the selecting operation for the next address to be processed, provided by the multiplexer 250, have to be completed within one CLOCK cycle, so that the next address to be processed is valid on address line 115 with every new CLOCK cycle.

In a preferred embodiment of FIG. 3, four different branching options can be chosen by means of the control lines 240 for the next address to be processed. Each of the branching options is represented by a respective address applied on the respective lines A–D and the next address to be processed can be selected by selecting either one of the lines A–D. The four branching options are:

Line A: stay on the current address;

Line B: advance the current address by a certain pre-given value (e.g., add "one" to the current address and select the operation code with the next higher address);

Line C: branch to a pre-given address, e.g., direct data bits from the control memory;

Line D: branch to an address stored in a stack, which, e.g., most commonly contains addresses used for subroutines.

The above four options for address operations represent the commonly used branching possibilities in most of the programming languages. However, it is to be understood that address operations according to the invention are not limited by those above shown address operations. Every possible address operation can be used, e.g., addresses from user feedback input or others. In certain applications when it is necessary to load a program to pre-given addresses, e.g., in the control memory 120, this pre-given addresses can serve as another address option when the "program load mode" is selected.

Detailed embodiments of the processor 110 of FIG. 3 will be shown and explained later for an example of an application of the processor 110.

It will be appreciated by those familiar in the art that in the processing unit 100 only one clocked (or triggered) register, the address register 260, is in the circuit loop of processor 110, address line 115, control memory 120 and the feed back loop 130. That means that correspondingly only one clocked (or triggered) register has an influence on the chronological sequence of signals necessary in the process to receive the next address of the operation code to be processed. This configuration allows that one operation code can be fully processed within one clock cycle (or until the next trigger signal appears). The flow of signals in that circuit loop has to be synchronized so that a valid address of the next operation code can be transmitted to the control memory 120 when the CLOCK (or another trigger) signal appears.

A possibility to increase the processing speed in the processor 110 is to reduce the bit length of the operation code. The operation code, stored in the control memory 120, is therefore divided into base function code and sub-function code. The base function code comprises the operation code used continuously during the operations, which means that base function code is required for every operation. The sub-function code comprises the data for the processor that is not required continuously during the processing, but only when a specific sub-function is requested. As an example for the operation of a counter to count until a predetermined value, a base function would be the counting function itself, which simply counts until a predetermined value is reached. In that counter example, a typical sub-function, which is only required when the predetermined value is reached, could be to load the counter register with a next value.

Figure 4:
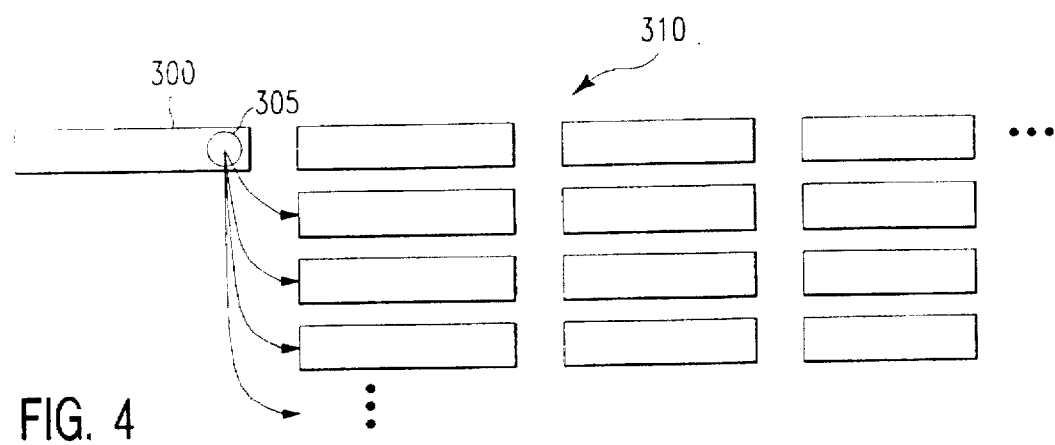
FIG. 4 shows an embodiment of the operation code divided into base function code and sub-function code.

FIG. 4 shows an embodiment of the operation code divided into base function code and sub-function code. At least one first byte 300 of the operation code contains at least one sub-function control bit 305. The first byte 300 comprises the base function code whereas a plurality of other bytes 310 of the operation codes comprise the sub-function code. The value of the at least one sub-function control bit 305 determines the meaning of the other bytes 310.

It is to be understood that the number of sub-function control bits 305 needed for an application is determined by the number of sub-functions required. Also, the number of the first bytes 300 containing the base functions and the number of other bytes 310 containing the sub-functions is determined by the complexity and the number of base and sub-functions. Furthermore, instead of providing predetermined sub-function control bits 305, the meaning of the other bytes 310 can be determined by certain pre-given bit combinations in the first bytes 300.

In a preferred embodiment the other bytes 310 are normally interpreted as an extended base function code that is code required for the processing of the base function. However, when a certain pre-given bit combinations in the first bytes 300 is recognized, the sub-function control bits 305 eventually determine which one of the sub-functions is represented by the sub-function code.

Instead of having all information provided in parallel by means of a high-bit-length operation code, the information in the data structure of FIG. 4 is hidden in the operation code and has to be interpreted with the help of the sub-function control bits 305. A detailed example will be given and explained later.

Consequently, to the division of the operation code into base function code and sub-function code, the control memory 120 comprises a base function section and a sub-function section. In operation, when a sub-function call (that is a request for additional data not comprised in the base function) is indicated, e.g., by the sub-function control bit 305 of the base function code, the base function code causes a processor jump operation. A processor jump operation means that when the next CLOCK signal appears, the processor 110 automatically "jumps" to a certain address, wherein the next operation code to be processed is stored, which is not explicitly given as an address in the present operation code. Such a processor jump operation can be an advance operation, e.g., advancing the current address by one. Preferably, the processor jump operation is executed hardware-forced, that means, e.g., that a certain bit combination of the operation code (preferably in the base function code) applied to the boolean interlock circuit 230 automatically selects the "advanced" address on line B.

Simultaneously to the processor jump operation, presently valid data from the sub-function section of the control memory 120 is loaded in predetermined sub-function registers of the functional processor unit 220. That means that concurrently the processor 110 carries out the processor jump operation, "hidden" data from the sub-function section of the control memory 120 is transferred into the sub-function registers of the functional processor unit 220. Due to that concurrent operation, no additional clock cycles are necessary so that processor dummy cycles can be avoided.

Figure 5:
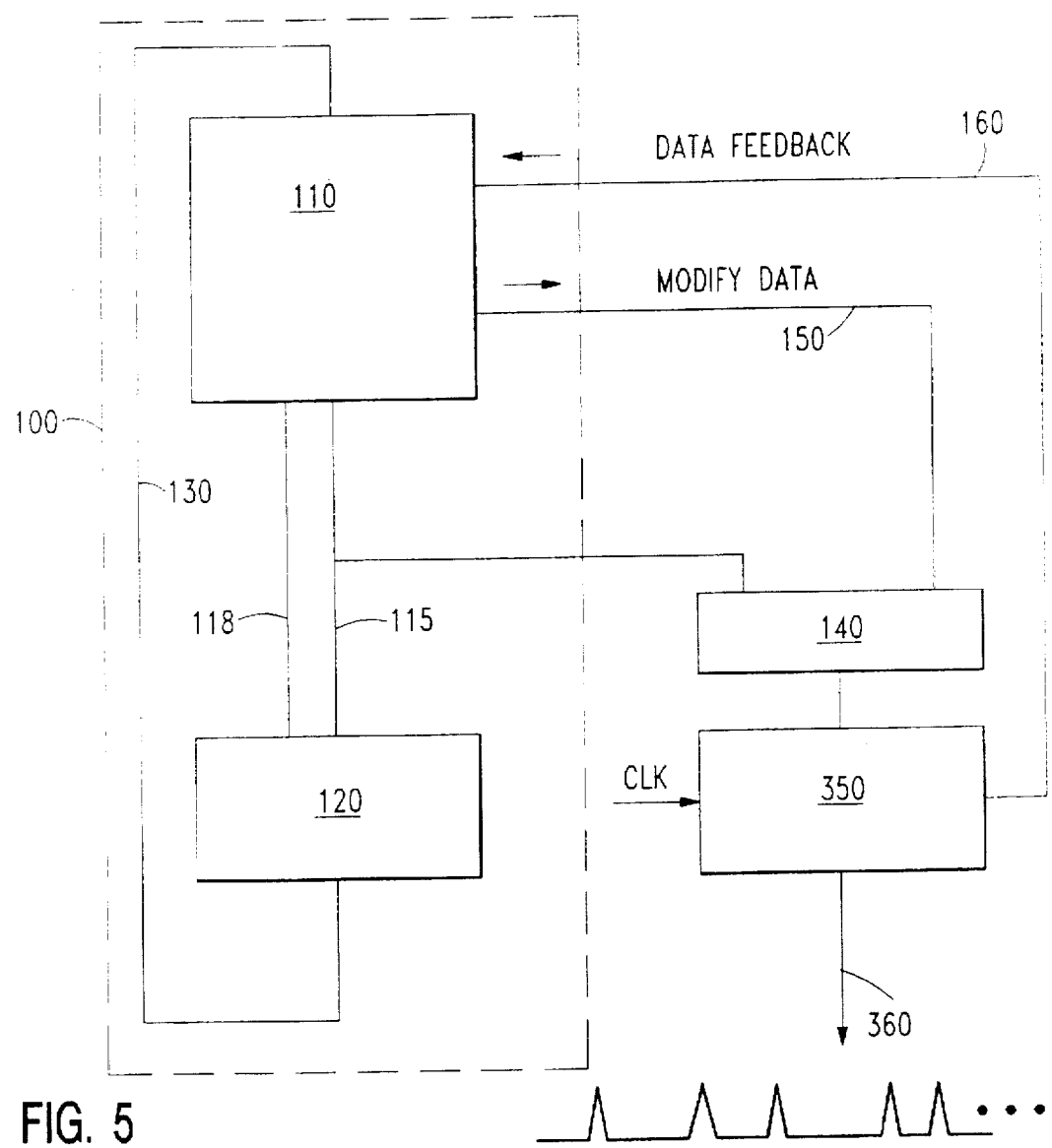
FIG. 5 shows as an example of an application of the processor 110 an embodiment of a frequency and timing generator.

An example of an application of the processor 110 in a frequency and timing generator as a sequencer circuit will be given the following to further explain the invention. FIG. 5 shows an embodiment of the frequency and timing generator. The frequency and timing synthesizer 350 is coupled to the user data memory 140 of FIG. 2 and further connected via line 160 to the processor 110. The frequency and timing synthesizer 350 can be any one as known in the art, however, preferably a frequency and timing synthesizer as described in the European Patent Application-No. 94108675.3 by the same applicant and inventor is to be used.

One object of the frequency and timing generator in FIG. 5 is to generate timing edges from pre-given (e.g., by the user or from a stored program) timing values representing timing edges to be produced. Preferably, a series of timing values is applied and series of serial timing edges have to be generated thereof The timing values are preferably stored in the user data memory 140. The control memory 120 contains the operation codes and conditions required for the timing and frequency generation.

In operation, when a timing edge is to be produced, processor 110 issues a valid address signal on address line 115 to the control memory 120 and the user data memory 140. The operation code to be processed in the processor 110 corresponding to the applied address on address line 115 is loaded from the control memory 120 to the processor 110 via line 130, as explained earlier. The processor 110 then processes this operation code and determines the address of the successive operation code to be processed. Simultaneously, the timing value (representing the timing edge to be presently generated) corresponding to the applied address on address line 115 is loaded from the user data memory 140 to the frequency and timing synthesizer 350 and a timing edge will be generated by the frequency and timing synthesizer 350 thereof.

It is clear that instead of applying an address signal to the user data memory 140 and then loading the respective timing value to the frequency and timing synthesizer 350, a signal that comprises the timing value of the timing edge to be presently produced and the address of the operation code to be processed could be used.

When the timing edge is output by the frequency and timing synthesizer 350 on its output line 360, the processor 110 is triggered via line 160 that the operation code for the next timing value can be processed. The processor 110 then issues on address line 115 the address of this next timing value and of the successive operation code to be processed in the processor 110.

In a preferred embodiment of the application of FIG. 5, the processor 110 is not clocked by an internal clock with a fixed frequency, but asynchronously by the trigger signal on line 160 issued by the frequency and timing synthesizer 350 when a timing edge has been processed. That means that one cycle of the processor 110 is determined by the time between two successive timing edges. This requires that the minimum cycle time of the processor 110 (the time required by the processor 110 to process one operation code for one timing value) must be at least equal to or less than the minimum time between successive timing edges of the frequency and timing synthesizer 350. In that embodiment, one operation cycle of the processor 110 equals to the operation cycle of the frequency and timing synthesizer 350.

When a frequency and timing synthesizer as described in the European Patent Application-No. 94108675.3 is used, a series of several timing values can be processed parallel. In that case the trigger signal on line 160 from the frequency and timing synthesizer 350 is first issued when a next series of timing values has to be processed (parallel). One cycle of the processor 110 is then determined by the time between the processing of two successive series of timing values. This allows that the required minimum cycle time of the processor 110 can be greater than the minimum time between successive timing edges of the frequency and timing synthesizer 350.

The operation code required for the above described application of FIG. 5 only requires one "DO operation":

IF if-condition DO if-operation, ELSEIF else-condition DO else-operation.

The operations (if-operation or else-operation) can be:

advance (address=present address+1)

go to label (address nn)

pop stack (branch to stack, decrement/rotate stack)

call interrupt routine (with the interrupt routines:
 system interrupt
 set stop flag
 stop system
 stop system and interrupt).

Figures 1, 6A:
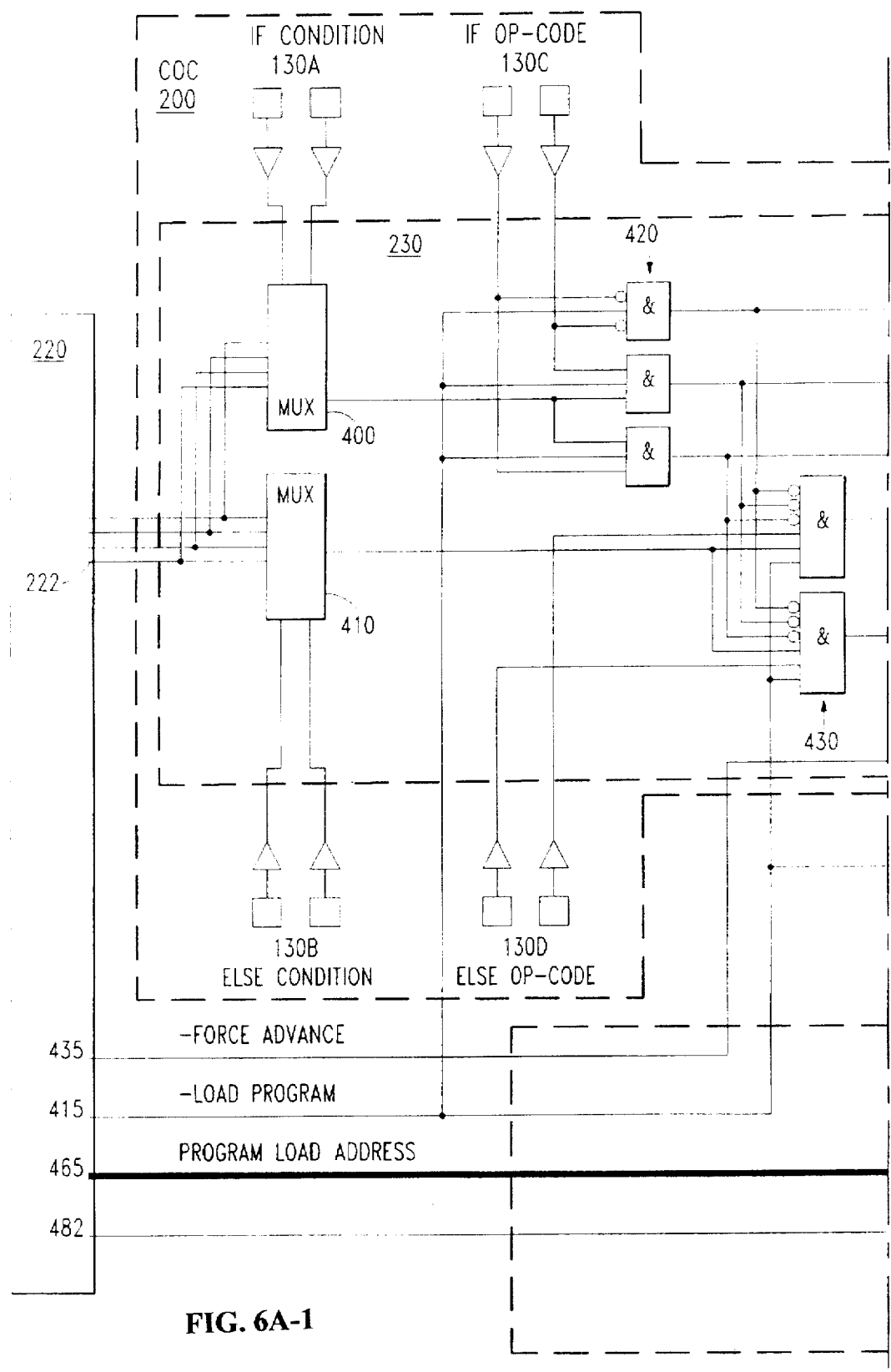
Figures 2, 6A:
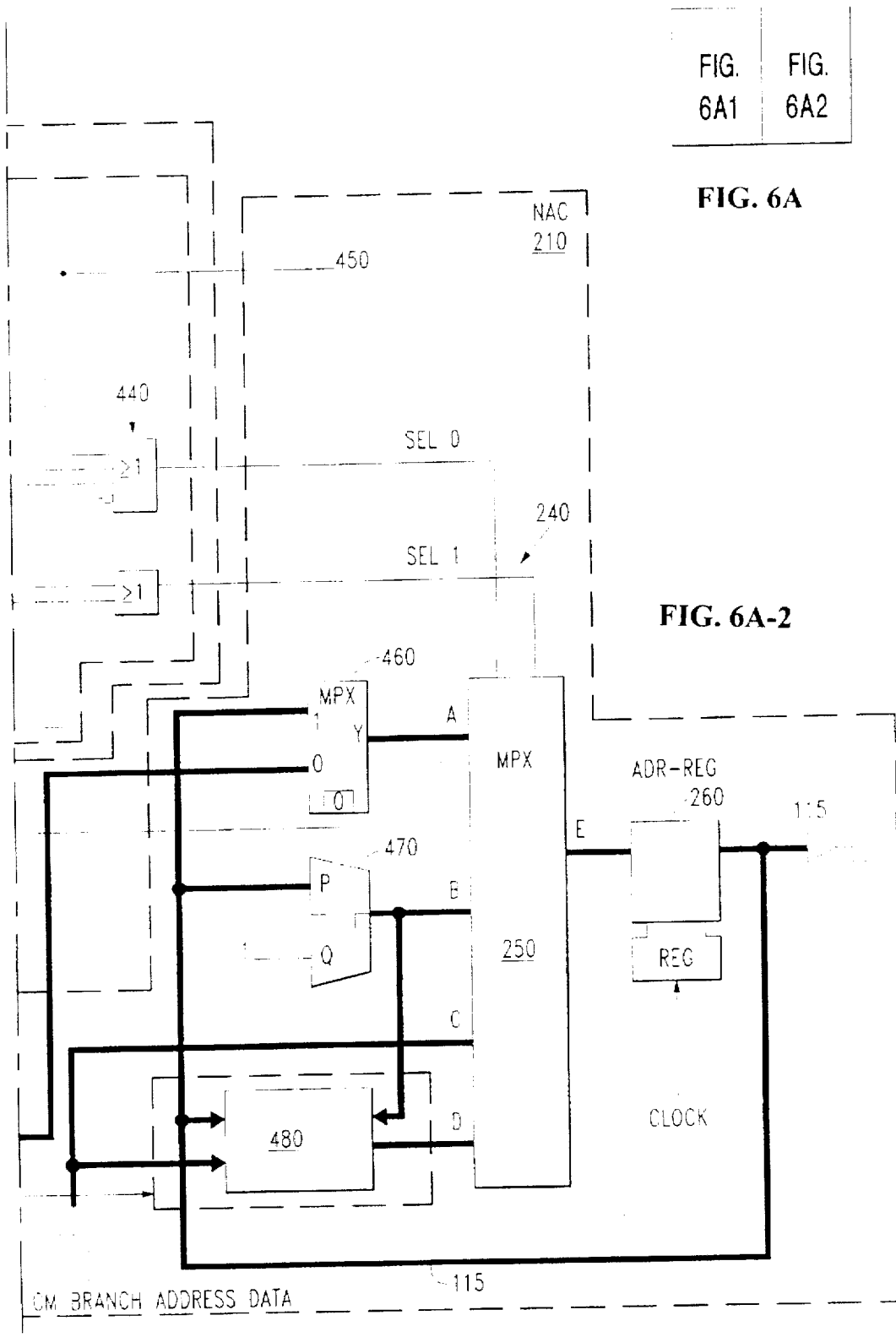

FIG. 6A shows a first detailed embodiment of the processor 110 for the application of FIG. 5. The condition and operation code control unit (COC) 200 receives the operation code at its input lines 130 and processes the operation code in the boolean interlock circuit 230. The if-condition is applied on input lines 130A, the else-condition is applied on input line 130B, the if-operation code is applied on input line 130C and the else-operation code is applied on input line 130D. The if-condition on input lines 130A is first applied as control input to a first multiplexing unit 400 and the else-condition on input line 130B as control input to a second multiplexing unit 410. The first and second multiplexing units 400 and 410 are to select an expected condition (e.g., branch, if program counter elapses) applied from the functional processor unit 220 on lines 222. It is to be understood that the conditions provided by the functional processor unit 220 depend on the application of the processor 110. The technique of providing internal conditions in a processor is well known in the art and needs not to be discussed herein.

The result of the selection in the first multiplexing unit 400, the if-operation code on input line 130C and a LOAD PROGRAM signal on a line 415 is applied to a first plurality of AND gate 420. The LOAD PROGRAM signal allows the COC 200 to pre-load program data into the control memory 120 and forces the mux 250 to select line A in the multiplexer 250. The result of the selection in the second multiplexing unit 410 with the else-operation code on input line 130D and the logical results of the first plurality of AND gate 420 is applied to a second plurality of AND gate 430.

The logical results of the first and second pluralities of AND gates 420 and 430 with a FORCE ADVANCE signal on a line 435 are then applied to a plurality of OR/NOR gates 440. The FORCE ADVANCE signal allows a hardware forced advancing of the current address. The logical result of the plurality of OR/NOR gates 440 is finally applied on the selection control lines 240 for the multiplexer 250.

It is to be understood that as well the number of respective parallel AND gates in the first and second pluralities of AND gates 420 and 430 and the plurality of OR/NOR gates 440 and their interconnections depend on the respective operation and conditions code used in the specific application. However, this interconnecting is well known in the art and needs not to be discussed herein in detail.

In a preferred embodiment of the boolean interlock circuit 230, an output of the first plurality of AND gate 420 provides an ENABLE SUBFUNCTION signal 450 when the LOAD PROGRAM signal 415 is high (that means that no program is to be loaded) and the if-operation code applied on input lines 130C is low. As explained earlier, the other bytes 310 (FIG. 4) are normally interpreted in that embodiment as an extended base function code, that is code required for the processing of the base function. However, when a certain pre-given bit combination in the first bytes 300 applied on input line 130C is applied, a subfunction call is recognized and the ENABLE SUBFUNCTION signal 450 is issued. In the embodiment of FIG. 6A, the certain pre-given bit combination is that all signals on lines 130C are low.

It is to be understood that the detailed interconnections of the logical gates in the boolean interlock circuit 230 depend on the operation code used in the processor 110. Basically the condition codes on lines 130A and 130B have to be arranged to select the conditions provided by the functional processor unit 220. The operation codes on lines 130C and 130D have to be combined with the selected condition from multiplexers 400 and 410 to select the next address to be processed by means of multiplexer 240. The operation codes on lines 130C and 130D can optionally be combined with the FORCE ADVANCE signal and the LOAD PROGRAM signal allowing to speed up the processing of a program load request for the control memory 120.

The next address control unit (NAC) 210 of the embodiment as shown in FIG. 6A comprises, beside the first multiplexer 250 and the address register 260, a second multiplexer 460. The second multiplexer 460 comprises the inputs of a PROGRAM LOAD ADDRESS on a line 465 and the output feed back from the address register 260 on address line 115. The PROGRAM LOAD ADDRESS signals the address in the control memory 120 where, in case a program is to be loaded into the control memory 120, a provided operation code to be stored will be stored in. The second multiplexer 460 is controlled by the LOAD PROGRAM signal 415 that selects either the current address on address line 115 or, in the case that a program is to be loaded into the control memory 120, the PROGRAM LOAD ADDRESS on line 465 to be set on line A as input for the first multiplexer 250.

Address line 115 with the current address is further coupled to an adder 470 that adds a predetermined value to the current address as the "advance address" for line B. Line B, line C with a "branch address" from the control memory 120 as the address to be branched to, and address line 115 with the current address are all connected as inputs to a stack 480. Line D represents the output of the stack 480. Which one of the addresses on the lines B, C, D or 115 that is to be set in the stack 480 is determined by the applied operation code via a stack control line 482.

Figure 6B:
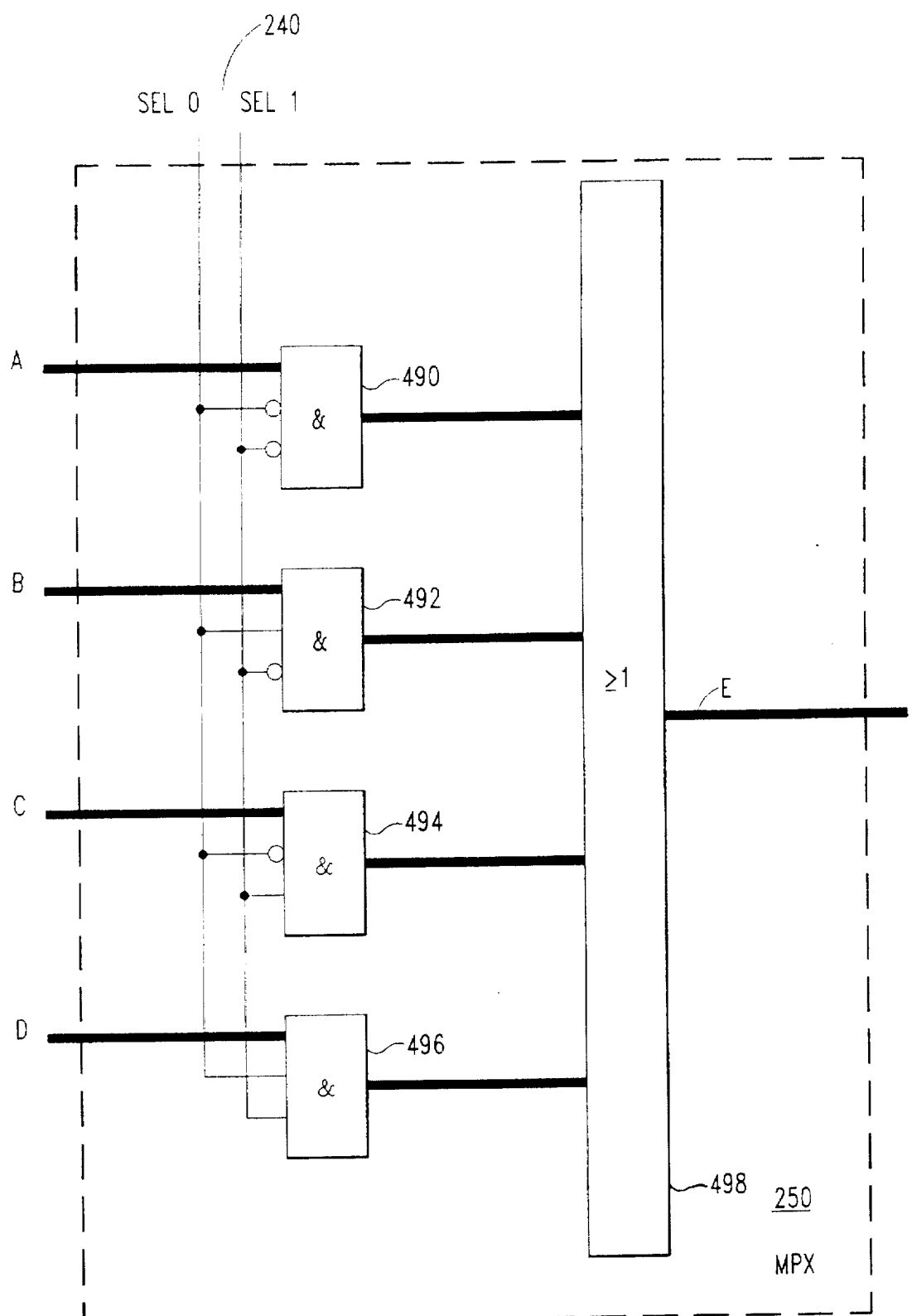
FIG. 6B shows an embodiment of the multiplexer 250.

FIG. 6B shows an embodiment of the multiplexer 250. Each line A–D serves with the selecting control lines 240 as input for respective AND gates 490, 492, 494 and 496. The outputs of the AND gates 490, 492, 494 and 496 serve as inputs for an OR gate 498 with line E as an output. It is clear that the inputs for the control lines 240 of the respective AND gates 490, 492, 494 and 496 have to be inverted suitably, so that either one of the AND gates 490, 492, 494 and 496 can be selected by means of the high/low combination on the control lines 240.

It has to be noted, that the thick lines as used in the figures represent multiple (n) parallel address lines. That means that the AND gates 490, 492, 494 and 496 have to represent multiple (n) parallel AND gates, each with the control lines 240 and one line of the respective multiple parallel address lines as inputs.

The embodiment of FIG. 6A requires one clocked edge triggered register, the address register 260. An oscillation of the feed back circuit loop provided by the processor 110, the address line 115, the control memory 120, and the feedback loop 130 is avoided in the circuit of FIG. 6A by the (edge triggered) address register 260.

Figures 1, 7A:
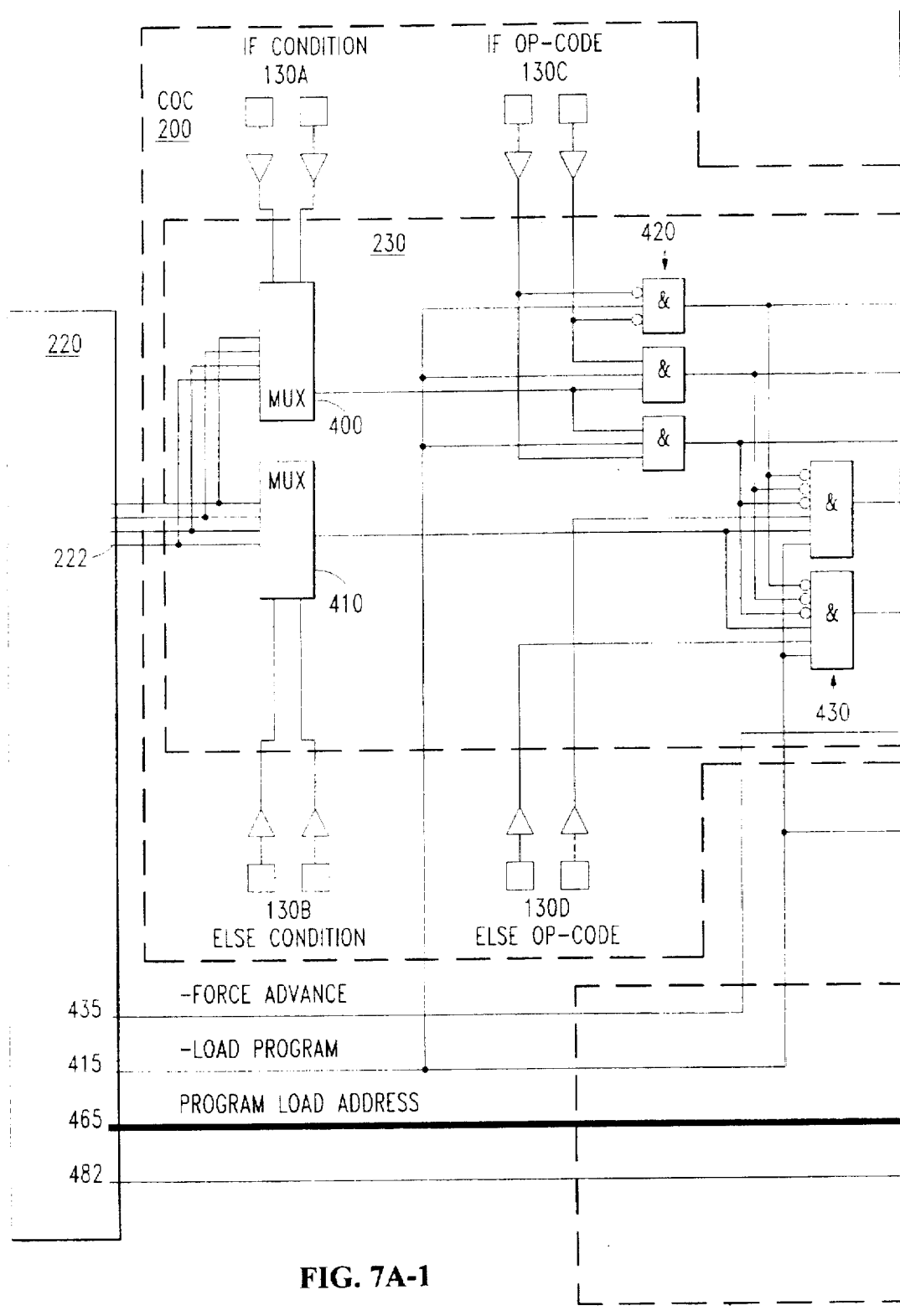
Figure 7A:
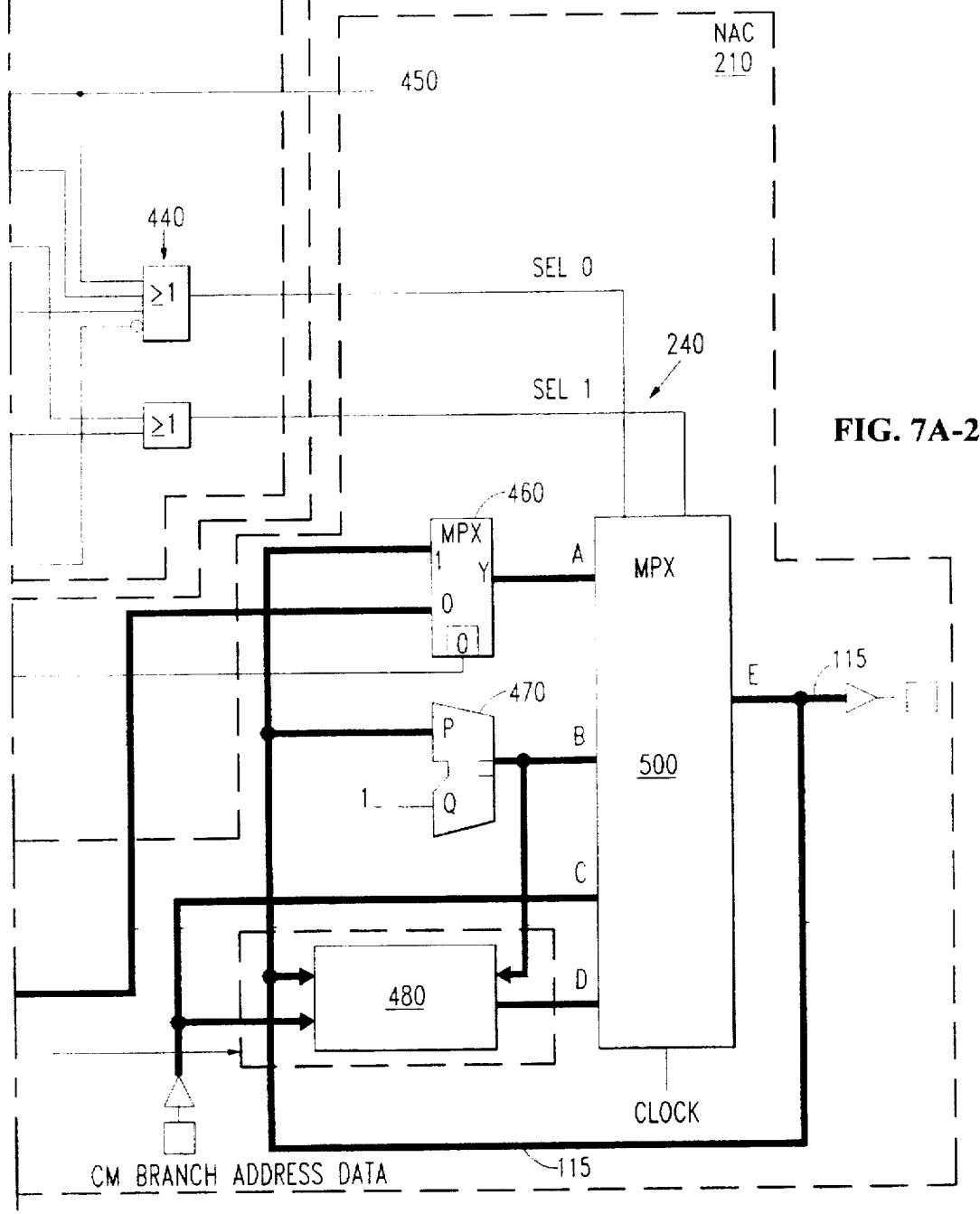

FIG. 7A shows another embodiment of the processor 110 without additional registers. The (edge triggered) address register 260 of FIG. 6A has been eliminated in the embodiment of FIG. 7A. The registering function in FIG. 7A is obtained by replacing the multiplexer 250 by a latched multiplexer 500, so that the feed back circuit loop is interrupted. Notice that the mux 500 receives the CLOCK signal as a control input.

Figure 7B:
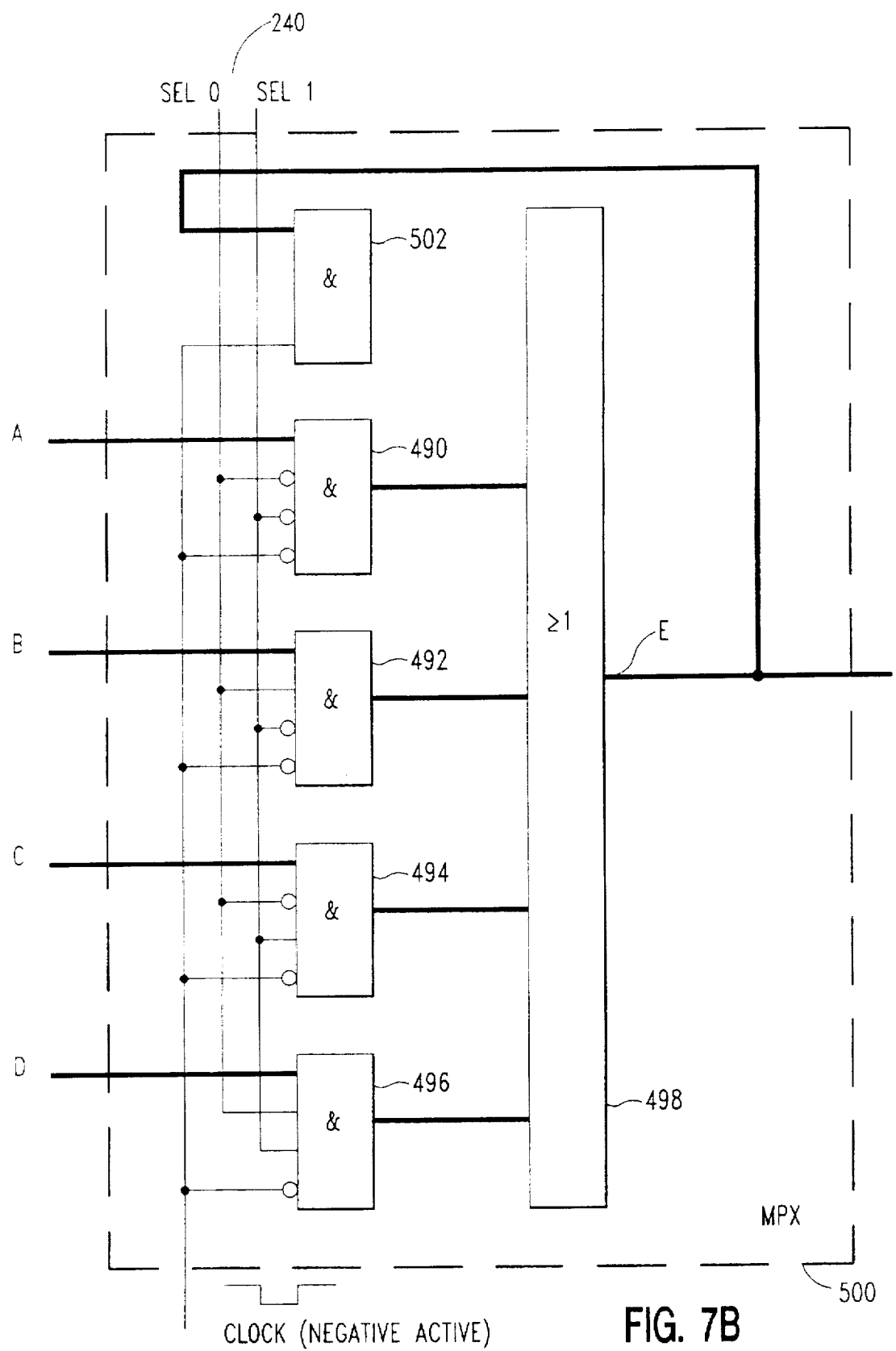
FIG. 7B shows an embodiment of the latched multiplexer 500.

FIG. 7B shows an embodiment of the latched multiplexer 500, which is basically built up the same as multiplexer 250, however, comprising additional features. The CLOCK signal is coupled to the respective AND gates 490, 492, 494 and 496 as an additional (inverted) input. The latched multiplexer 500 further comprises an additional AND gate 502 with the (non-inverted) CLOCK signal and the output line E of the OR gate 498 as an input. Since no register at the output of OR gate 498 is needed, the output line E of the OR gate 498 directly represents the address line 115.

The latched multiplexer 500 is, due to the applied CLOCK signal, level triggered. The respective AND condition can only be fulfilled at the respective AND gates 490–496 and 502 when a predetermined level of the CLOCK signal appears at the inputs of the AND gates 490–496 and 502. That means that the selected line of the lines A–D will first be set to the OR gate 498, and therefore to line 115, when this predetermined level of the CLOCK signal appears. Also, the selected line of the lines A–D is only valid on the line 115 since this predetermined level of the CLOCK signal is kept. This function of the latched multiplexer 500, that a signal can propagate through the latch for a certain period, the "active time" when the CLOCK signal keeps the predetermined level, is also called "transparent." This is in comparison to an edge triggered latch in which no temporal signal propagation is allowed and the signal is only transmitted when the respective edge occurs.

In the embodiment of FIG. 7B the latched multiplexer 500 is, in consequence of the inverted CLOCK signals, a so called negative active latch. That means that the predetermined level of the CLOCK signal is the "low" level of the clock.

The functioning condition for the emulation of the registering function by the latched multiplexer 500 is that the "active time" of the CLOCK signal for the latched multiplexer 500 (to let the selected line propagate through) must be smaller than the smallest possible feedback time in any one of the various circuit loops comprised of processor 110, address line 115, control memory 120 and feed back loop 130. In other words, it has to be made sure that the response of a valid address applied on the address line 115 cannot influence this address itself. This would otherwise lead to an uncontrollable oscillation in that circuit loops.

In the circuit of FIG. 7A, the above mentioned functioning condition for the emulation of the registering function by the latched multiplexer 500 is that the "active time" of the CLOCK signal for the latched multiplexer 500 must be smaller than the control memory 120 access time and the shortest delay time of the respective gates in any one of the circuit loops. The control memory 120 access time is the time from applying a new address to (e.g., the read address input of) the control memory 120 to the earliest possible data change at the data output of the control memory 120.

As a consequence of the above discussed functioning condition, the feedback time in each of the various circuit loops of processor 110, address line 115, control memory 120 and feed back loop 130 is preferably kept in a certain range smaller than the longest possible feedback time of the slowest circuit loop. That means that slower, low cost components can be used in faster circuit loops to adjust unnecessarily fast feedback times.

Figures 1, 7C:
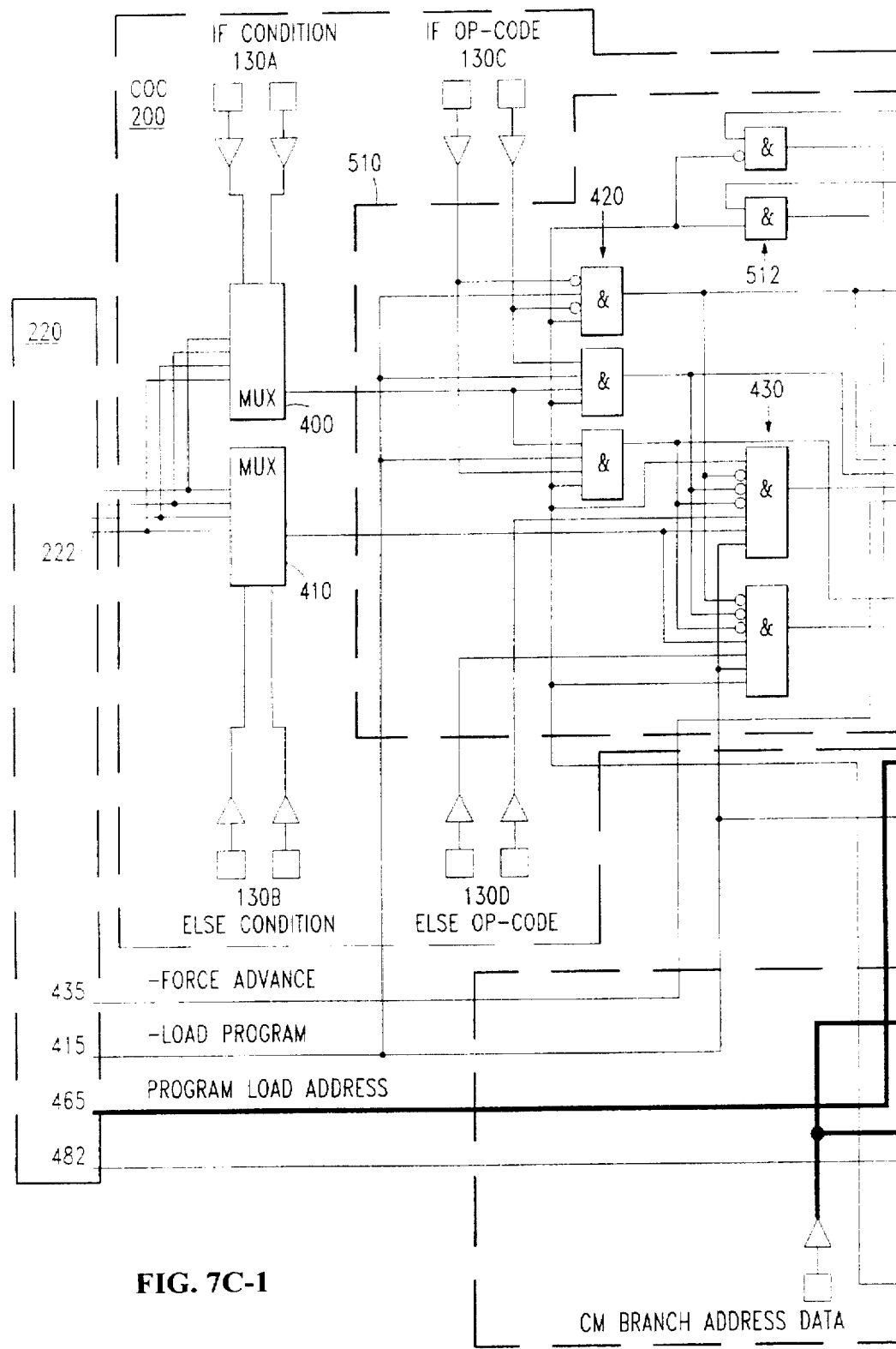

Another possibility for emulating the registering function without the need of an actual register is to design the first and second pluralities of AND gates 420 and 430 with the plurality of OR gates 440 of the boolean interlock circuit 230 as a transparent latch 510. FIG. 7C shows an implementation of the transparent latch 510. The explanations to the transparent latch 510 are substantially the same as the explanations given to the latched multiplexer 500 of FIG. 7B. The CLOCK signal is coupled to the respective AND gates of the first and second plurality of AND gates 420 and 430 as an additional (here: non-inverted) input. The transparent latch 510 further comprises a plurality of additional AND gates 512 with the (here: inverted) CLOCK signal and the control lines 240 as inputs.

In case that the functioning condition for the emulation of the registering function is not achievable solely by the latched multiplexer 500 or the transparent latch 510, e.g., due to the use of low cost components, a combination of the latched multiplexer 500 and the transparent latch 510 as a master-slave latch will ensure the required registering function without the need of an additional register. Both, the transparent latch 510 and the latched multiplexer 500 are level triggered, or "transparent," in the embodiment of FIG. 7C. That means that when a predetermined level of the CLOCK signal appears to either the transparent latch 510 or the latched multiplexer 500, a valid output is shifted to the respective output lines.

To synchronize the latching of the transparent latch 510 and the latched multiplexer 500 within one CLOCK cycle, the transparent latch 510 is to be implemented as a positive active latch, while the latched multiplexer 500 is to be implemented as a negative active latch. That means that when the CLOCK signal is "high," the transparent latch 510 is transparent while the latched multiplexer 500 is not transparent (and therefore latched). When the CLOCK signal is "low," the latched multiplexer 500 is transparent while the transparent latch 510 is not transparent (and therefore latched). This embodiment represents a typical masterslave latch wherein two latches are interconnected in series and clocked successively within one CLOCK cycle.

In the circuit of FIG. 7C, the synchronization of the latching of the transparent latch 510 and the latched multiplexer 500 is obtained by inverting the CLOCK signal for the latched multiplexer 500. This arrangement allows a reliable operation of the processor 110 without the need for additional hardware for registering.

In a further embodiment as shown, an additional master slave structure in the address loops can be implemented by means of clockable components with the respective input lines A–D as their outputs. In FIG. 7C, the multiplexer 460, the adder 470 and the stack 480 are all embodied as positive active, clockable devices being transparent if a certain level of the positive CLOCK signal is applied. Furthermore, a positive active, clockable latch 520 with line C as output is included in the next address control unit (NAC) 210 of FIG. 7C.

The elimination of the address register 260 in FIGS. 7 leads to a reduction of the transient time in the processor 110 from the elimination of the transient time of the address register 260. Furthermore, the setup time of the commonly used edge triggered D-registers for the address register 260 becomes no longer necessary. This leads to a perceptible decrease of the required CLOCK cycle time for a reliable performance of the operations in the processor 110, and thus, to a remarkable increase of the processing speed in the processor 110, and therefore, to higher applicable CLOCK frequencies.

It is to be noted that the processor as disclosed herein can also be used as a controller. A controller as a subsystem governs the functions of attached devices but generally does not change the meaning if the data that may pass through it. The attached devices are usually peripherals or communication channels. One of the functions of the controller may involve processing the data stream to format it for transmission or recording.

It is also to be noticed that the processor 110 is shown and explained herein in a simple configuration only for the sake of clarity. However, further optional functions, such as an ALU in the processor 110 or the like, can also be applied.

I claim:

1. A real time processing unit having a processor for processing an operation code, the processor comprising:
   an operation code control unit for receiving and processing a first operation code in response to a first pulse of a clock and generating a logical result at an output thereof;
   a memory addressable by the processor on an address line so that an operation code corresponding to the applied address is loadable by the processor, and
   a multiplexing unit having a plurality of input lines selectable in response to said output of said operation code control unit, each of said plurality of input lines receiving signals representing potential next addresses in memory containing second operation codes to be processed by the processor, and the selected next address being outputed by said multiplexing unit; and
   said multiplexing unit generating said selected next address before a second pulse of said clock signal is received wherein the multiplexing unit outputs said selected next address when a second pulse of said clock signal is received by the processor.

2. The processing unit according to claim 1, wherein the operation code control unit comprises a latching means receiving said clock signal so that the generated logical result is transmittable to the multiplexing unit only when a pulse of said clock signal is received.

3. The processing unit according to claim 2, wherein the operation code control unit and the multiplexing unit comprise a master-slave latch, wherein the multiplexing unit is open when the operation code control is latched, and the multiplexing unit is latched when the operation code control unit is open.

4. The processing unit according to claim 1, wherein a signal on one of said plurality of input lines indicates a potential next address that is the same as a current address.

5. The processing unit according to claim 1, wherein a signal on one of said plurality of input lines indicates a potential next address that is offset from a current address by a pre-given value.

6. The processing unit according to claim 1, wherein a given pulse from said clock signal initiates a sequential operation of said address line, said external memory, said plurality of input lines, and said multiplexer.

7. A method for processing an operation code in a real time processing unit having a processor, the method comprising the steps of:
   issuing a signal comprising an address of an operation code to be processed by the processor when a first trigger signal from a clock signal with a fixed frequency is received;
   loading the operation code corresponding to the address issued in the first step to the processor;
   processing the loaded operation code, whereby one result of the processing is selection of an address of the successive operation code to be processed from a plurality of optional address signals, which will be processed when a successive trigger signal appears; and
   modifying the data by the processor in a memory, while other user data and control data are received by the processor during the loading and processing steps.

8. The method according to claim 7, wherein the trigger signal is an asynchronous signal which appears whenever the processing of an operation code is required.

9. The method according to claim 7, wherein the operation code comprises a base function code and a sub-function code.

10. The method according to claim 9, wherein the base function code includes the operation code which is required continuously during a given processor operation; and, wherein the sub-function code includes data required only when a specific sub-function is requested during said given processor operation.

11. The method according to claim 10, wherein the base function code comprises a control code that determines the sub-function code.

12. The method according to claims 7, wherein the step of processing the loaded operation code is determined by advancing the address of the presently processed operation code by a pre-given value when a request for a sub-function is recognized.

13. A real time processing unit, comprising:
   a) an addressable memory, having operational code stored therein;
   b) trigger signal input for receiving trigger signals;
   c) processor means,
      coupled to both the trigger signal input, and the addressable memory,
      for sending, upon receiving a first trigger signal, an operational code address to the addressable memory,
      for receiving, before the arrival of a next trigger signal, a corresponding operational code from the addressable memory, said operational code having a base function code and a sub-function code, and
      for processing, before the arrival of the next trigger signal, the operational code to determine a next operational code address in accordance with one or both of said base function code and said sub-function code; and
   d) a register for receiving the next operational code address and releasing the next operational code address from the processor means to the addressable memory upon receiving the trigger signal.

14. The processing unit according to claim 13, wherein the processor means further comprises:

a) an operation code control unit for receiving and processing the operation code, from the addressable memory, in a boolean circuit and generating a logical result therefrom, and b) a next address control unit including:

b1) a multiplexing unit with a plurality of input lines selectable by the multiplexing unit in response to receiving the logical result, whereby the input lines represent possible combinations of operation code addresses used to select operational code stored in the addressable memory; and b2) a register, coupled to receive the operation code address generated by the multiplexing unit, and coupled to receive the trigger signals, for sending the operations code addresses upon receiving the trigger signals.

* * * * *